(12) United States Patent
Hirose

(10) Patent No.: US 11,275,605 B2
(45) Date of Patent: Mar. 15, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Eiko Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 15/950,882

(22) Filed: Apr. 11, 2018

(65) Prior Publication Data

US 2018/0314546 A1 Nov. 1, 2018

(30) Foreign Application Priority Data

Apr. 28, 2017 (JP) .............................. JP2017-090583

(51) Int. Cl.
*G06F 9/48* (2006.01)
*G06F 9/445* (2018.01)
*G06F 9/4401* (2018.01)

(52) U.S. Cl.
CPC .............. *G06F 9/48* (2013.01); *G06F 9/4411* (2013.01); *G06F 9/44505* (2013.01); *G06F 9/44552* (2013.01)

(58) Field of Classification Search
CPC ...... G06F 9/48; G06F 9/4843; G06F 9/44552; G06F 9/44505; G06F 9/4411; G06F 9/45504; G06F 9/45533; H04N 21/4437
See application file for complete search history.

(56) References Cited

U.S. PATENT DOCUMENTS

| | | | | |
|---|---|---|---|---|
| 6,239,836 B1 * | 5/2001 | Suzuki | ............... | H04N 5/23206 348/211.3 |
| 8,042,117 B2 * | 10/2011 | Ohta | ....................... | G06F 9/485 719/310 |
| 9,838,641 B1 * | 12/2017 | Lim | .................... | H04N 5/23241 |
| 2003/0076437 A1 * | 4/2003 | Karasaki | ............ | H04N 5/23293 348/347 |
| 2007/0041029 A1 * | 2/2007 | Yoo | ..................... | H04N 1/00167 358/1.13 |

(Continued)

FOREIGN PATENT DOCUMENTS

| | | |
|---|---|---|
| JP | 2009-015400 A | 1/2009 |
| JP | 2010-266955 A | 11/2010 |

(Continued)

*Primary Examiner* — Phil K Nguyen
*Assistant Examiner* — Brian J Corcoran
(74) *Attorney, Agent, or Firm* — Canon U.S.A., Inc. I.P. Division

(57) ABSTRACT

An information processing apparatus includes a call unit, a detection unit, and a control unit. The call unit makes a call request for a second application according to a first application. The detection unit detects, in a case where the call request for the second application is made, whether the second application is in a state of performing a predetermined function. The control unit performs control to switch and operate the second application in a predetermined mode based on a detection result of the state of the second application. In a case where the second application operates in the predetermined mode, the control unit performs control not to perform the predetermined function provided by the second application.

7 Claims, 11 Drawing Sheets

(56) References Cited

U.S. PATENT DOCUMENTS

| | | | |
|---|---|---|---|
| 2008/0177905 A1* | 7/2008 | Ohta | G06F 9/45533 |
| | | | 710/14 |
| 2016/0227097 A1* | 8/2016 | Tanaka | H04N 1/00103 |
| 2018/0146139 A1* | 5/2018 | Leung | H04N 5/23245 |

FOREIGN PATENT DOCUMENTS

| | | |
|---|---|---|
| JP | 2012-212348 A | 11/2012 |
| JP | 2014-002713 A | 1/2014 |
| JP | 2014-182751 A | 9/2014 |
| JP | 2017-079450 A | 4/2017 |

* cited by examiner

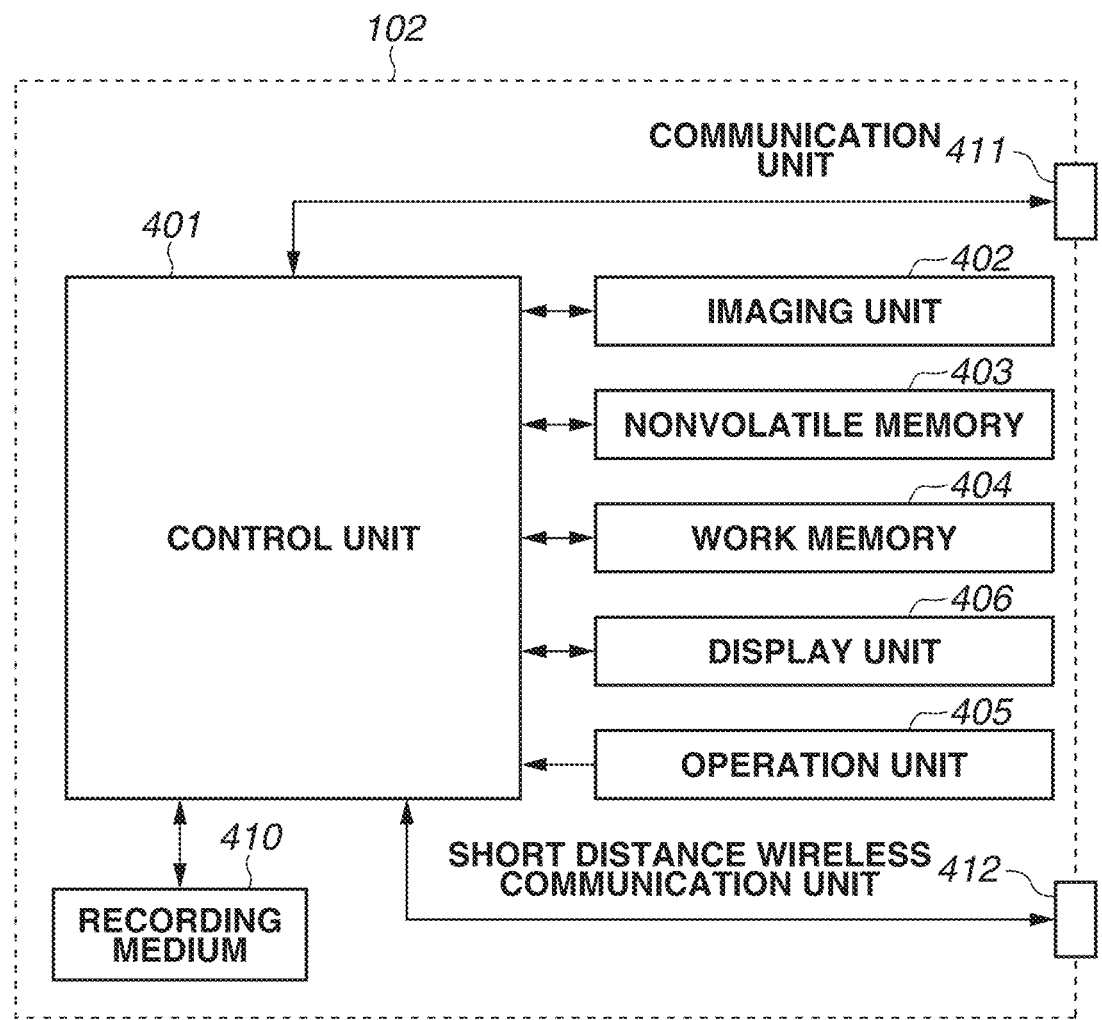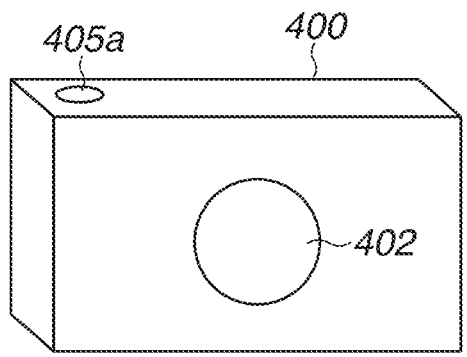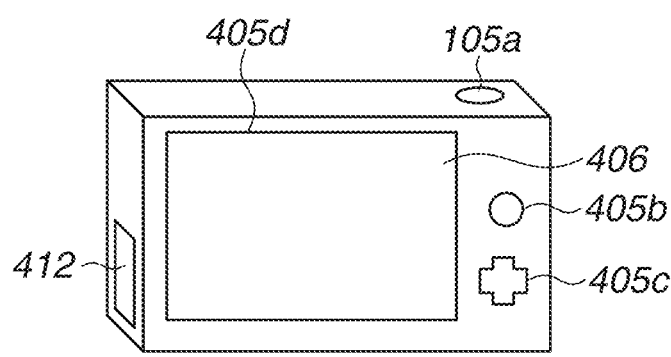

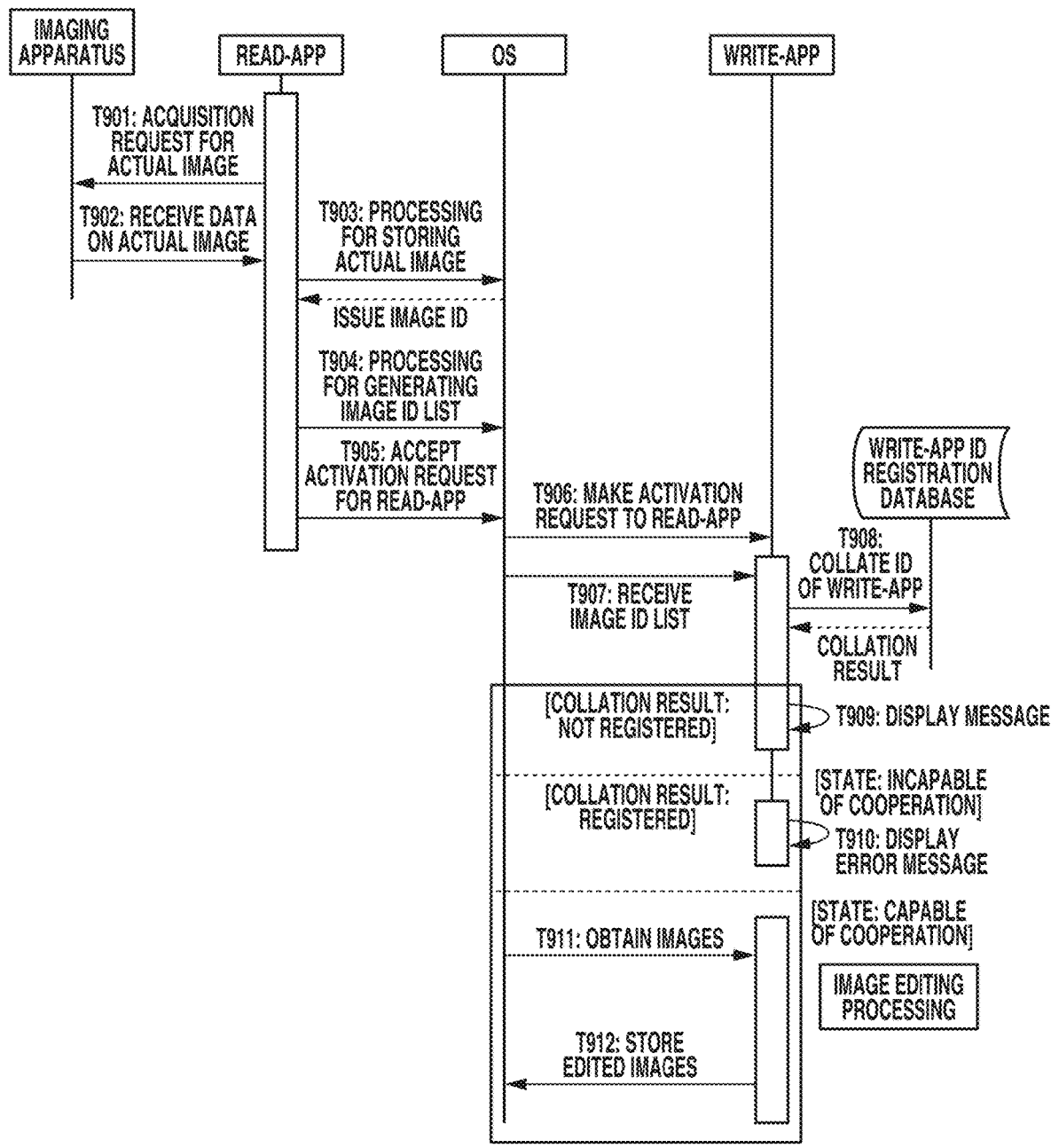

INFORMATION PROCESSING APPARATUS, INFORMATION PROCESSING METHOD, AND STORAGE MEDIUM

BACKGROUND OF THE INVENTION

Field of the Invention

The present disclosure particularly relates to an information processing apparatus, an information processing method, and a storage medium which are suitably used to perform processing by using a plurality of applications.

Description of the Related Art

Information processing apparatuses such as a smartphone can implement various functions by installing an operating system (OS) and a plurality of applications, and operating using the applications. For example, a camera connection application can be used to connect to a camera and obtain images. An image editing application can be used to edit images. There has been known a function of using such a plurality of applications in linkage with each other.

For example, Japanese Patent Application Publication No. 2012-212348 discusses sharing data between a plurality of applications by transmitting the data from a linkage source application to a linkage destination application via an OS. Here, the data is obtained by the linkage source application making a multifunction peripheral (MFP) perform scan processing.

For example, suppose that an information processing apparatus includes a first application for obtaining images from a camera and a second application for editing the images. When the second application is running, the first application is called to obtain target data of the editing processing. However, the first application sometimes cannot respond to an activation request from the second application depending on its operation state.

SUMMARY OF THE INVENTION

The present disclosure is directed to facilitating recognition, when a first application is called by an operation according to a second application, that the first application cannot accept an activation request from the second application if it is.

According to an aspect of the present invention, an information processing apparatus includes a call unit configured to make a call request for a second application according to a first application, a detection unit configured to detect, in a case where the call request for the second application is made, whether the second application is in a state of performing a predetermined function, and a control unit configured to perform control to switch and operate the second application in a predetermined mode based on a detection result of the state of the second application, wherein, in a case where the second application operates in the predetermined mode, the control unit performs control not to perform the predetermined function provided by the second application.

Further features of the present invention will become apparent from the following description of embodiments with reference to the attached drawings.

BRIEF DESCRIPTION OF THE DRAWINGS

FIG. 4A is a block diagram illustrating a hardware configuration example of an imaging apparatus.

FIGS. 4B and 4C illustrate an example of appearance of the imaging apparatus.

FIG. 9 is a sequence diagram for describing a processing procedure for obtaining images by the write-app, activating the read-app, and editing the images according to a third embodiment.

DESCRIPTION OF THE EMBODIMENTS

Embodiments will be described in detail below with reference to the drawings. The components described in the embodiments are merely illustrative and are not to limit the scope of the disclosure thereto.

A first embodiment will be described below with reference to the drawings. The present embodiment deals with a case where a user operates a communication apparatus (smartphone) serving as an information processing apparatus to activate an image editing application and activate a data acquisition application. In the present embodiment, "activation" of an application refers to either activating an unactivated application or moving an application running in the background to the foreground.

Network Configuration

Figure 1:
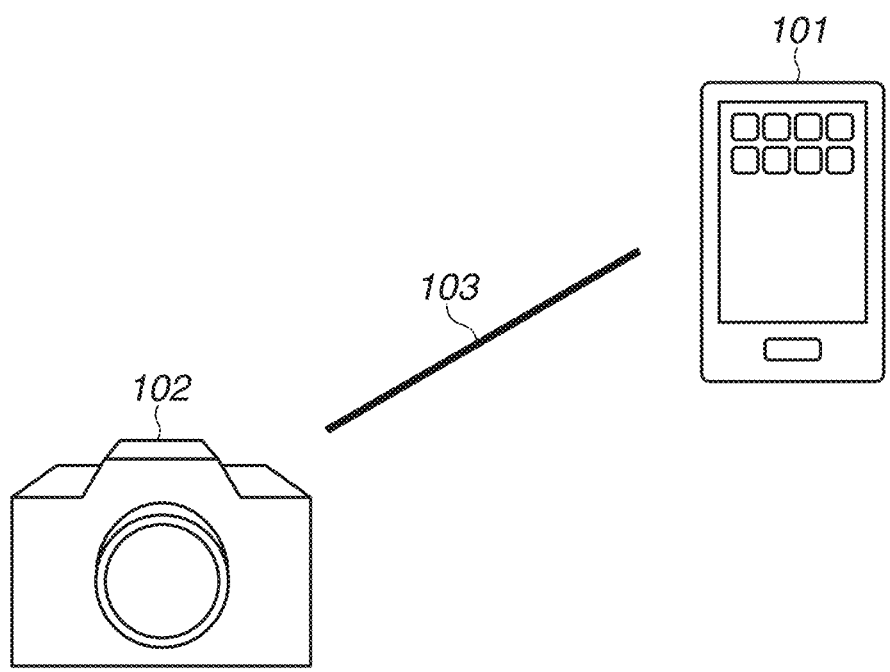
FIG. 1 is a diagram for describing a configuration example of a network including a communication apparatus.

FIG. 1 is a diagram for describing a configuration example of a system including a communication apparatus 101 according to the present embodiment.

As illustrated in FIG. 1, the communication apparatus 101 can connect to an imaging apparatus 102 by using a data acquisition application, and obtain images from the imaging apparatus 102 via a network 103. Either wired or wireless communication may be used for the connection with the imaging apparatus 102.

Configuration of Communication Apparatus

Figure 2:
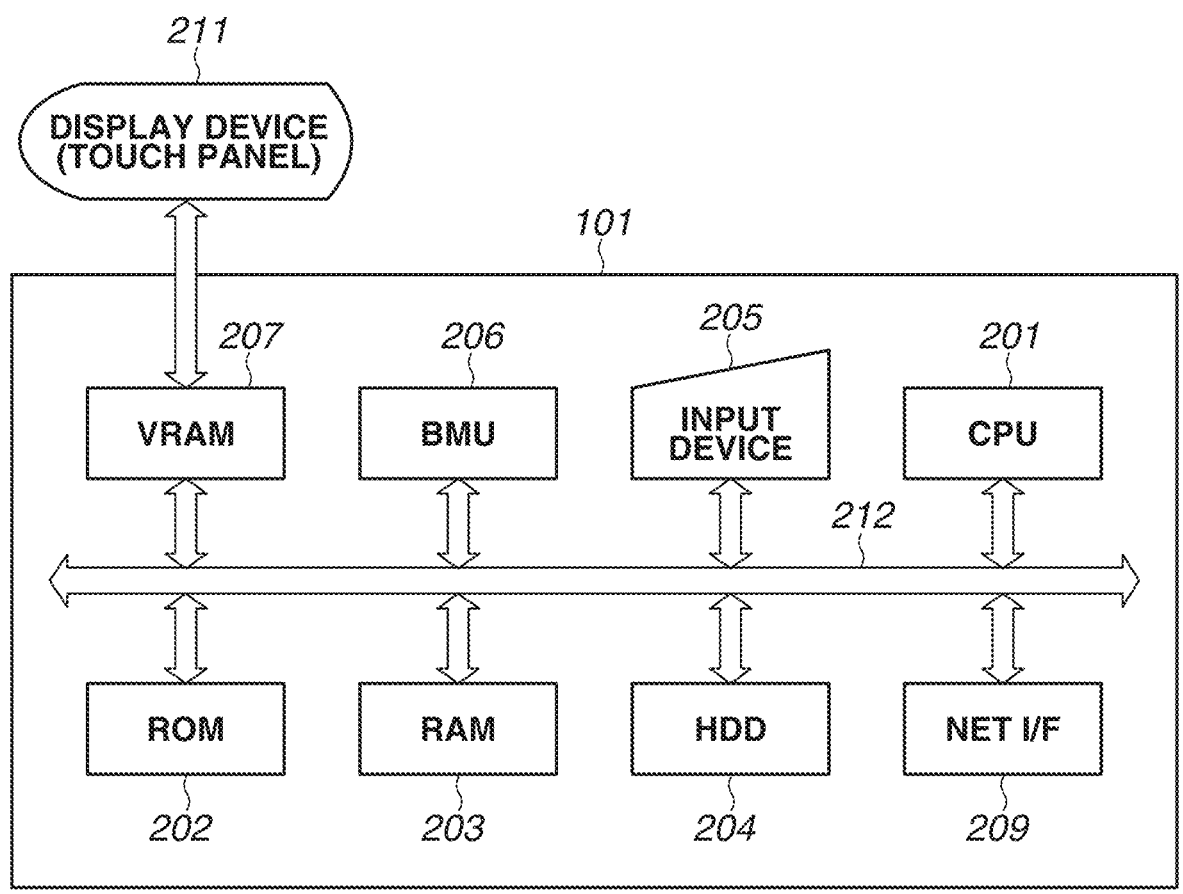
FIG. 2 is a block diagram illustrating a hardware configuration example of the communication apparatus.

FIG. 2 is a block diagram illustrating a hardware configuration example of the communication apparatus 101 according to the present embodiment.

In FIG. 2, a central processing unit (CPU) 201 controls processing of the entire communication apparatus 101. A read-only memory (ROM) 202 stores various control programs to be executed by the CPU 201 and data. A random access memory (RAM) 203 includes a work area of the CPU 201, a data save area during error processing, and a load area of the control programs. A hard disk drive (HDD) 204 stores an OS, various applications, control programs to be executed in the communication apparatus 101, contents, and data.

An input apparatus 205 includes various buttons such as a button for switching power on and off. A bit move unit (BMU) 206 controls, for example, data transfer between memories, e.g., between a video RAM (VRAM) 207 and another memory, and data transfer between a memory and an input/output (I/O) device, e.g., a net I/F 209. Image data to be displayed on a display device 211 is drawn on the VRAM 207. The image data drawn on the VRAM 207 is transferred to the display device 211 according to a predetermined rule, whereby the image is displayed on the display device 211. The display device 211 includes a touch panel. The user touches the display surface of the display device 211 to input an instruction related to an icon displayed at that position. The net I/F 209 communicates with the imaging apparatus 102 via the network 103. A bus 212 includes an address bus, a data bus, and a control bus.

Figure 3:
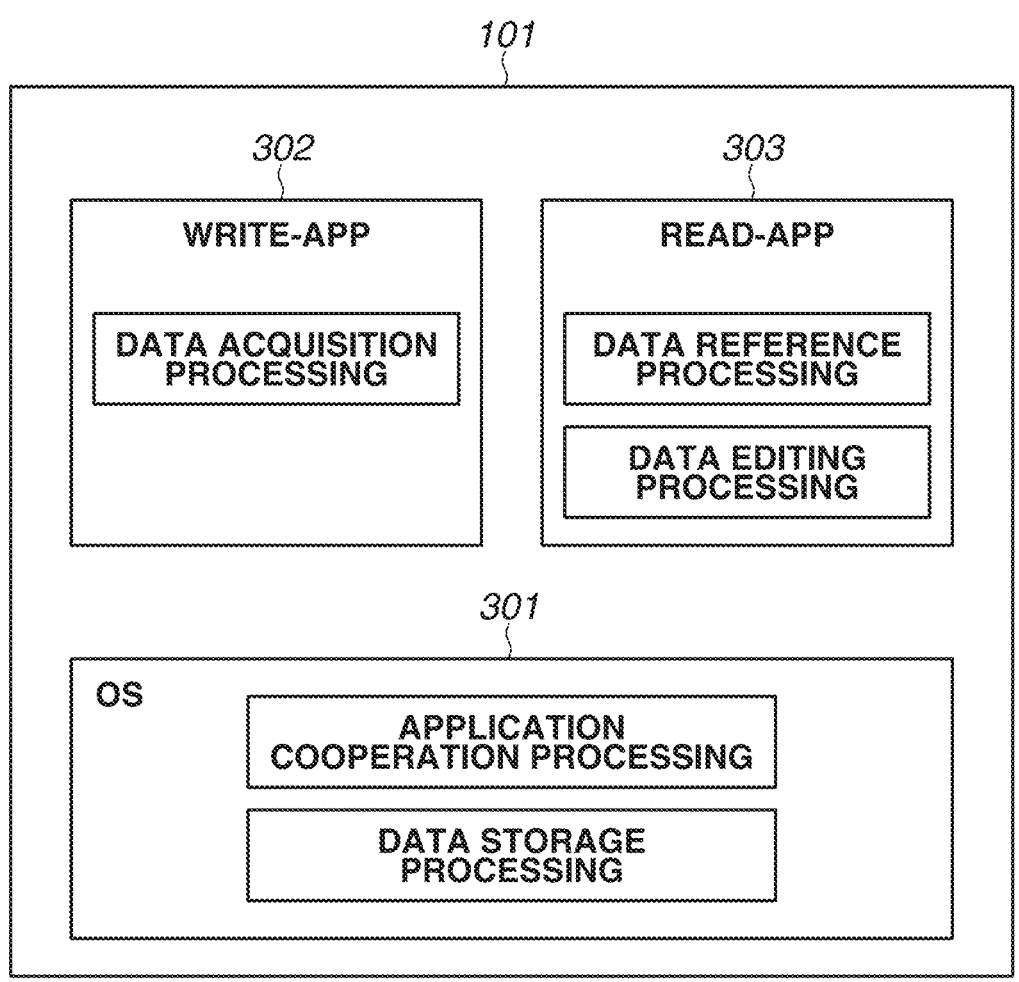
FIG. 3 illustrates a software configuration example of the communication apparatus.

FIG. 3 illustrates a software configuration example of the communication apparatus 101 according to the present embodiment.

The communication apparatus 101 is equipped with a predetermined OS 301. A data acquisition application (hereinafter, write-app) 302 and an image editing application (hereinafter, read-app) 303 are installed on the communication apparatus 101. The CPU 201 of the communication apparatus 101 activates the OS 301 to perform basic processing for the communication apparatus 101 to perform, and performs linkage processing of installed applications and processing for recording data on the HDD 204. The CPU 201 of the communication apparatus 101 activates the write-app 302, for example, to obtain an image from the imaging apparatus 102 via the net I/F 209. The CPU 201 of the communication apparatus 101 activates the read-app 303 to process the obtained image or instruct a printing apparatus to print the image. The write-app 302 can be said to be an input application and an output application. A plurality of read-apps 303 can be installed on the communication apparatus 101. In the present embodiment, one of the read-apps 303 will be described as an example.

Configuration of Imaging Apparatus

FIG. 4A is a block diagram illustrating a configuration example of the imaging apparatus 102 which is an example of an external apparatus according to the present embodiment. While the imaging apparatus 102 is described here as an example of the external apparatus, the external apparatus is not limited thereto. For example, the external apparatus may be a portable media player or an information processing apparatus such as a tablet device or a personal computer.

A control unit 401 controls various parts of the imaging apparatus 102 based on input signals and programs to be described below. Instead of the control unit 401 controlling the entire imaging apparatus 102, a plurality of pieces of hardware may control the entire imaging apparatus 102 by sharing the processing.

An imaging unit 402 includes, for example, an optical lens unit, an optical system for controlling an aperture, zooming, and focusing, and an image sensor for converting light (video image) guided in through the optical lens unit into an electrical video signal. A complementary metal-oxide-semiconductor (CMOS) or charge-coupled device (CCD) image sensor is typically used as the image sensor. The imaging unit 402 is controlled by the control unit 401 to convert object light focused by a lens included in the imaging unit 402 into an electrical signal by using the image sensor, perform noise reduction processing, and output digital data as image data. The imaging apparatus 102 according to the present embodiment records the image data on a recording medium 410 according to the Design rule for Camera File system (DCF) standard.

A nonvolatile memory 403 is an electrically erasable and recordable nonvolatile memory, and stores programs to be executed by the control unit 401, which will be described below.

A work memory 404 is used as a buffer memory for temporarily storing data of an image captured by the imaging unit 402, an image display memory of a display unit 406, and a work area of the control unit 401.

An operation unit 405 is used to accept instructions for the imaging apparatus 102 from the user. For example, the operation unit 405 includes a power button for the user to instruct the imaging apparatus 102 to power on and off, a release switch for giving instructions for imaging, and a playback button for giving instructions to reproduce image data. The operation unit 405 further includes operation members such as a dedicated connection button for starting communication with the external apparatus via a communication unit 411 to be described below. The touch panel formed on the display unit 406 to be described below is also included in the operation unit 405. The release switch includes a switch SW1 and a switch SW2. If the release switch is half-pressed, the switch SW1 turns on. The operation unit 405 thereby accepts an instruction for performing imaging preparations such as autofocus (AF) processing, automatic exposure (AE) processing, automatic white balancing (AWB) processing, and preliminary flash emission (electronic flash (EF)) processing. If the release switch is fully pressed, the switch SW2 turns on. The operation unit 405 thereby accepts an instruction to perform imaging.

The display unit 406 displays a viewfinder image during imaging, displays captured image data, and provides a character display for interactive operations. The display unit 406 does not necessarily need to be built in the imaging apparatus 102. The imaging apparatus 102 can be connected to an internal or external display unit 406, and may include at least a display control function of controlling display of the display unit 406.

The recording medium 410 can record the image data output from the imaging unit 402. The recording medium 410 may be configured to be detachably attachable to the imaging apparatus 102, or built in the imaging apparatus 102. In other words, the imaging apparatus 102 includes at least a way to access the recording medium 410.

The communication unit 411 is an interface for connecting with the external apparatus. The imaging apparatus 102 according to the present embodiment can exchange data with the external apparatus via the communication unit 411. For example, the imaging apparatus 102 can transmit image data generated by the imaging unit 402 to the external apparatus via the communication unit 411. The imaging by the imaging unit 402 can be controlled from the external apparatus via the communication unit 411. In the present embodiment, the communication unit 411 includes an interface for communicating with the external apparatus by using a wireless local area network (LAN) according to the Institute of Electrical and Electronics Engineers (IEEE) 802.11 standard. The control unit 401 implements wireless communication with the external apparatus by controlling the communication unit 411.

A short distance wireless communication unit 412 includes, for example, an antenna for wireless communication, and a modulation and demodulation circuit and a communication controller for processing wireless signals. The short distance wireless communication unit 412 implements short-range wireless communication according to the IEEE 802.15 standard (Bluetooth (registered trademark)) by outputting a modulated wireless signal from the antenna and demodulating a wireless signal received by the antenna. In the present embodiment, Bluetooth Low Energy version 4.0 (hereinafter, BLE) of low power consumption is used for Bluetooth (registered trademark) communication. BLE communication has a narrow communication coverage (i.e., short communication distance), compared to wireless LAN communication. BLE communication also has a low communication speed, compared to wireless LAN communication. Meanwhile, BLE communication has power consumption lower than that of wireless LAN communication. The imaging apparatus 102 according to the present embodiment can exchange data with the external apparatus via the short distance wireless communication unit 412. For example, the imaging by the imaging unit 402 can be controlled from the external apparatus via the communication unit 411. Note that the image data generated by the imaging unit 402 is not transmitted by the short distance wireless communication unit 412 since the communication speed is low.

The communication unit 411 of the imaging apparatus 102 according to the present embodiment has an access point (AP) mode in which the communication unit 411 operates as an access point in an infrastructure mode, and a client (CL) mode in which the communication unit 411 operates as a client in the infrastructure mode. If the communication unit 411 is operated in the CL mode, the imaging apparatus 102 according to the present embodiment can operate as a CL device in the infrastructure mode. If the imaging apparatus 102 operates as a CL device, the imaging apparatus 102 can connect to an AP device nearby and join a network formed by the AP device. If the communication unit 411 operates in the AP mode, the imaging apparatus 102 according to the present embodiment can operate as a simplified AP which is a kind of AP with limited functionality. If the imaging apparatus 102 operates as a simplified AP, the imaging apparatus 102 forms a network by itself. Devices around the imaging apparatus 102 recognize the imaging apparatus 102 as an AP device, and can join the network formed by the imaging apparatus 102. A program for operating the imaging apparatus 102 as described is stored in the nonvolatile memory 403.

The imaging apparatus 102 according to the present embodiment is a simplified AP, a kind of AP having no gateway function of transferring data received from a CL device to an Internet provider. Even if the imaging apparatus 102 receives data from another device joining the network formed by itself, the imaging apparatus 102 therefore does not transfer the data to another network such as the Internet.

Next, an appearance of the imaging apparatus 102 will be described. FIGS. 4B and 4C are diagrams illustrating an example of the appearance of the imaging apparatus 102. A release switch 405a, a playback button 405b, a directional pad 405c, and a touch panel 405d are operation members included in the foregoing operation unit 405. The display unit 406 displays an image obtained as a result of imaging by the imaging unit 402. The imaging apparatus 102 according to the present embodiment includes an antenna portion of the short distance wireless communication unit 412 in a side surface of the camera housing. The imaging apparatus 102 and another apparatus can establish short distance wireless communication if their short distance wireless communication units 412 are brought close to each other within a certain distance. This allows contactless communication without the intervention of a cable, and can limit the communication partner according to the user's intention.

Processing Procedure of Communication Apparatus

Next, a processing procedure of the communication apparatus 101 according to the present embodiment will be described with reference to FIGS. 5 to 7E. The present embodiment describes processing in which the CPU 201 of the communication apparatus 101 initially activates the read-app 303, accepts the user's instructions from a screen for performing processing of the read-app 303, and calls the write-app 302.

Figure 5:
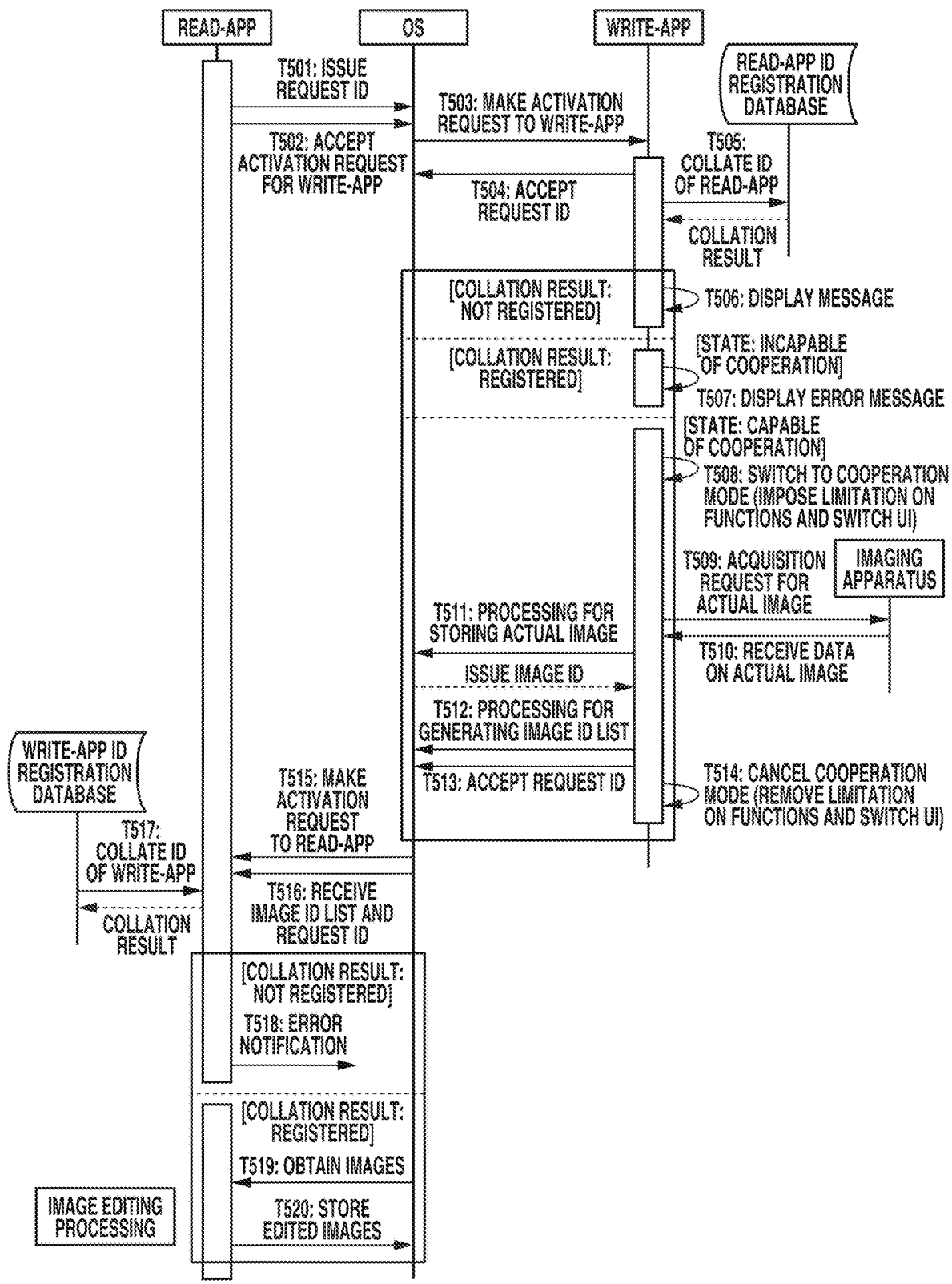
FIG. 5 is a sequence diagram for describing a processing procedure for activating a write-app from a read-app, obtaining images, and editing the images according to a first embodiment.

FIG. 5 is a sequence diagram for describing a processing procedure according to the present embodiment, in which the CPU 201 of the communication apparatus 101 activates the read-app 303, then activates the write-app 302, and obtains images from the external apparatus by using the write-app 302. The CPU 201 then performs image editing processing on the obtained images by using the read-app 303. The processing to be described below is implemented by the CPU 201 of the communication apparatus 101 activating the OS 301, the write-app 302, and the read-app 303, and operating according to such programs and controlling various parts as appropriate.

Figure 7A:
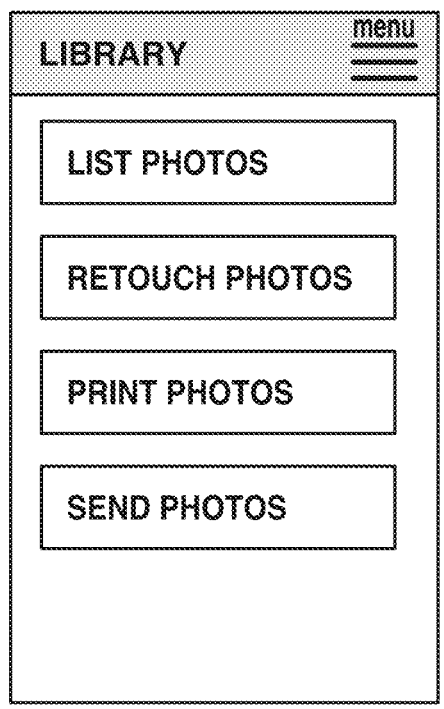
FIGS. 7A, 7B, 7C, 7D, and 7E illustrate examples of display screens of the read-app.

The CPU 201 of the communication apparatus 101 initially starts processing by activating the read-app 303 in response to the user's operation. Activating the read-app 303, the CPU 201 displays a screen such as illustrated in FIG. 7A on the display device 211. The user selects, on the screen illustrated in FIG. 7A, the content of editing to be performed via the touch panel of the display device 211.

Figure 7B:
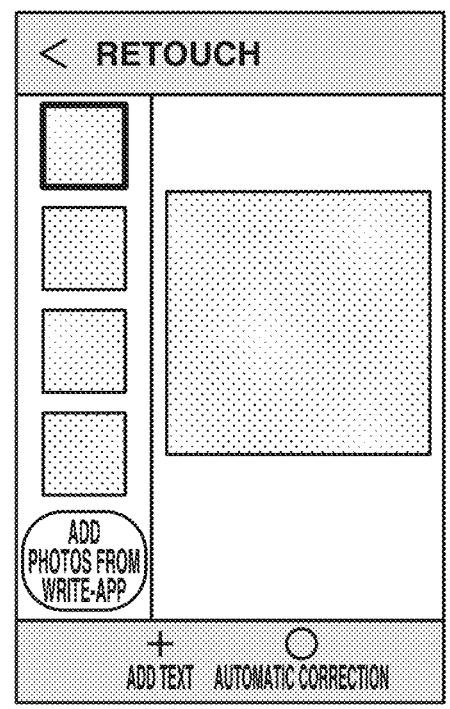
Figure 7C:
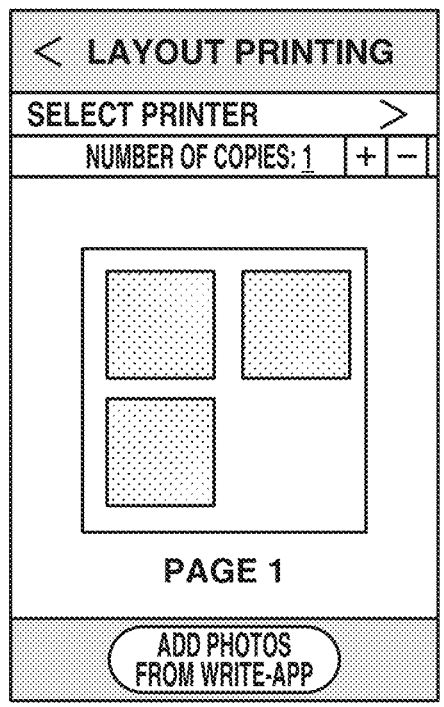
Figure 7D:
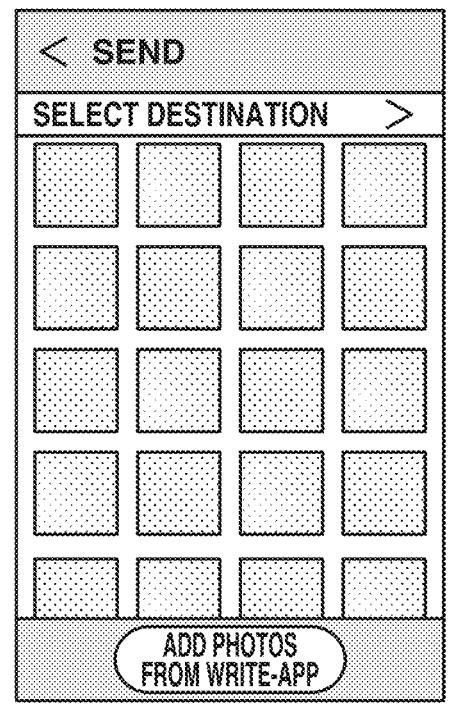

For example, if "RETOUCH PHOTOS" is selected, a screen illustrated in FIG. 7B is displayed on the display device 211. If "PRINT PHOTOS" is selected, a screen illustrated in FIG. 7C is displayed on the display device 211. If "SEND PHOTOS" is selected, a screen illustrated in FIG. 7D is displayed on the display device 211. On the screens illustrated in FIGS. 7B to 7D, the user can select an image or images he/she wants to edit from the images stored in the HDD 204. If the user wants to edit an image or images that are not stored in the communication unit 101, "ADD PHOTOS FROM WRITE-APP" can be selected to obtain an image or images from the external apparatus. The processing illustrated in FIG. 5 starts if the "ADD PHOTOS FROM WRITE-APP" is selected by the user.

In step T501 in FIG. 5, the CPU 201 issues a request identifier (ID) from the read-app 303. In step T502, the CPU 201 accepts an activation request for the write-app 302 from the read-app 303, and stores the request ID issued in step T501 and the activation request into the HDD 204 in association with each other. Different request IDs are assigned depending on the content of editing selected. For example, the request ID varies depending on which of the screens illustrated in FIGS. 7B to 7D the "ADD PHOTOS FROM WRITE-APP" is selected from.

In step T503, the CPU 201 makes an activation request to the write-app 302 from the OS 301 so that the write-app 302 is activated. In step T504, the CPU 201 makes the write-app 302 accept the request ID. When the write-app 302 is activated, the write-app 302 receives an ID of the requesting read-app 303. The ID of the read-app 303 is an ID unique to the read-app 303 installed on the communication apparatus 101. The ID of the read-app 303 is stored in the HDD 204 when the read-app 303 is installed, and read and notified from the HDD 204 when an activation request for the write-app 302 is made.

In step T505, the CPU 201 collates the ID of the read-app 303 by using the write-app 302. More specifically, the CPU 201 determines by using the write-app 302 whether the ID of the requesting read-app 303 coincides with the ID of the read-app 303, stored in the HDD 204. The CPU 201 operates according to the write-app 302 and stores in advance the ID of the read-app 303 that can cooperate with the write-app 302, into the HDD 204 in a manner readable to the write-app 302. If the ID of the read-app 303 does not coincide with the ID stored in the HDD 204, then in step T506, the CPU 201 displays a message that the request from the application is not acceptable, and quits the present processing. This can prevent the write-app 302 from being accidentally activated by an unknown application.

Figure 6A:
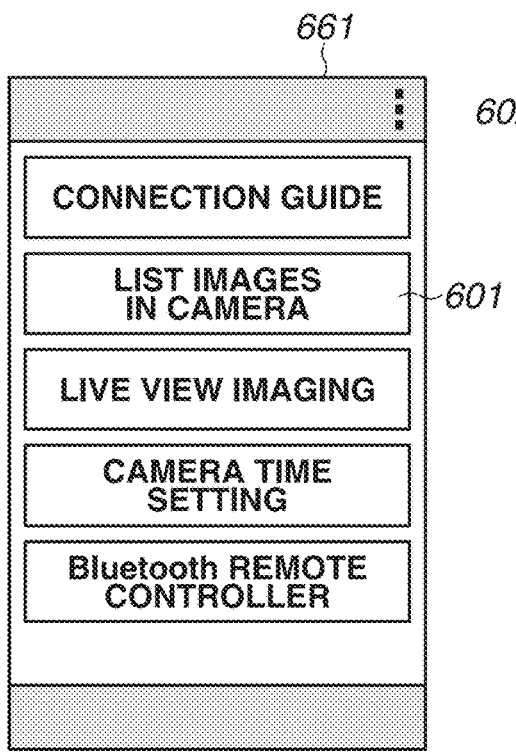
FIGS. 6A, 6B, 6C, 6D, 6E, 6F, 6G, and 6H illustrate examples of display screens of the write-app.

If the ID of the read-app 303 coincides with the ID stored in the HDD 204, the CPU 201 activates the write-app 302. A screen of the write-app 302 is thereby displayed in the foreground. For example, if the write-app 302 is not running and is newly activated, a top screen 661 illustrated in FIG. 6A is displayed. If the write-app 302 is running and performing, for example, a "live view imaging" function in the background, a screen for live view imaging is displayed.

The CPU 201 then detects a state of the write-app 302, and performs processing based on the detected state. In a case where the write-app 302 is incapable of linkage, then in step T507, the CPU 201 performs processing for displaying an error message by using the write-app 302. In a case where the write-app 302 is capable of linkage, then in step T508, the CPU 201 switches the write-app 302 to a linkage mode and operates the write-app 302 in the foreground.

In the present embodiment, the state that is incapable of linkage refers to a state in which the write-app 302 is running on the communication apparatus 101 and performing a specific function, e.g., any one of live view imaging, camera time setting, and remote controller functions. For live view imaging, the communication apparatus 101 connects to the imaging apparatus 102 via Wi-Fi® wireless communication, receives a live view image from the imaging apparatus 102, and displays the live view image on the display device 211. The communication apparatus 101 then transmits instructions about imaging processing, such as a change of an imaging setting, a movement of a focus frame, and releasing, to the imaging apparatus 102 in response to the user's operations. The imaging apparatus 102 performs imaging processing according to the instructions from the communication apparatus 101. For camera time setting, the communication apparatus 101 obtains and transmits time information set in the own apparatus to the imaging apparatus 102. The imaging apparatus 102 sets time based on the time information from the communication apparatus 101. For a remote controller, the communication apparatus 101 connects to the imaging apparatus 102 via Bluetooth (registered trademark) communication, and transmits a release instruction to the imaging apparatus 102. The imaging apparatus 102 performs imaging processing in response to the release instruction from the communication apparatus 101.

Figure 6B:
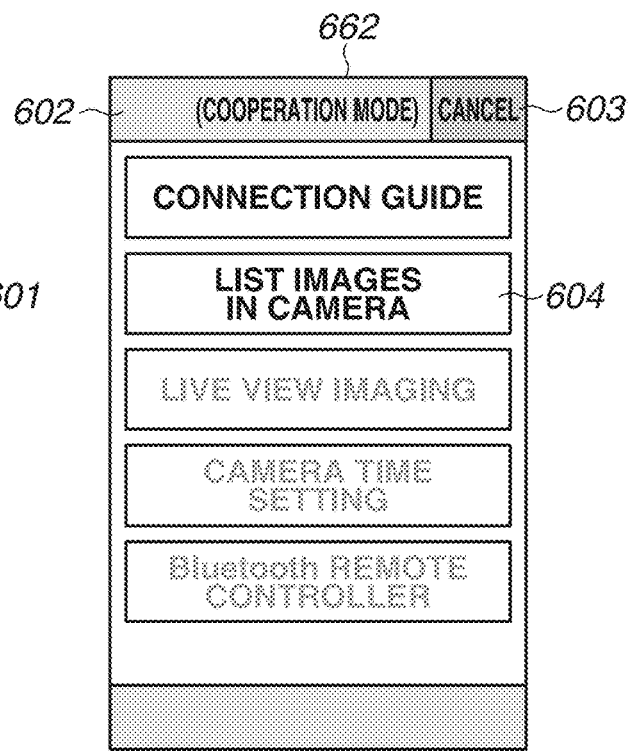
Figure 6C:
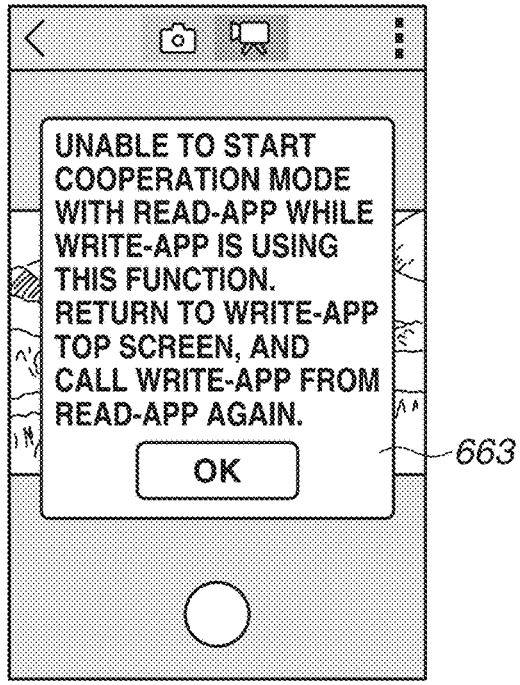

If the write-app 302 is detected to be in the state that is incapable of linkage, then in step T507, the CPU 201 operates according to the write-app 302 and displays an error message 663 indicating that the linkage mode is unable to be started, on the display device 211 as illustrated in FIG. 6C. This can inform the user that the write-app 302 is currently in a state of being temporarily unable to be called from the read-app 303, and images obtained from the imaging apparatus 102 by the write-app 302 are not usable as processing targets of the read-app 303.

The CPU 201 may be configured so that in a case where the write-app 302 is incapable of linkage, the CPU 201 operates according to the read-app 303, not the write-app 302, to display an error message on the display device 211. In such a case, the CPU 201 calls the read-app 303 from the write-app 302 via the OS 301, and notifies the read-app 303 of the state that is incapable of linkage. The CPU 201 thereby activates and runs the read-app 303 in the foreground, and performs the processing for display the error message according to the read-app 303.

Figure 6D:
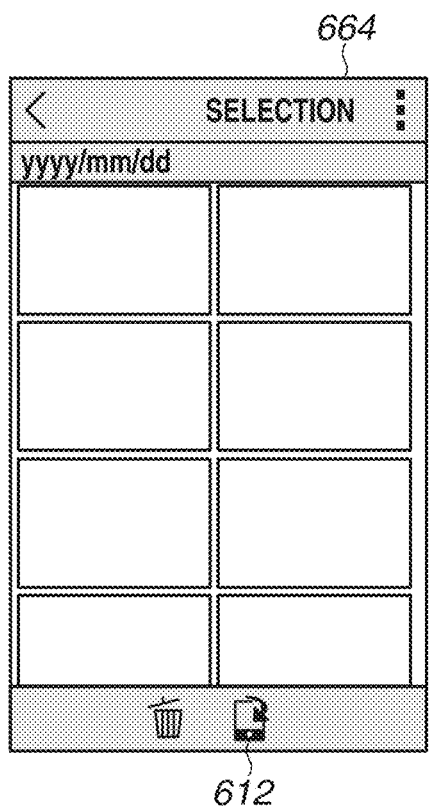

In the present embodiment, the state capable of linkage refers to a state in which the write-app 302 is running on the communication apparatus 101 and performing a function different from those in the state that is not capable of linkage. Examples of such a function include displaying a top menu screen, displaying a connection guide, and displaying a list of images in the camera. The state capable of linkage also applies when the write-app 302 is not activated. In displaying the connection guide, the communication apparatus 101 reads display data about the connection guide from the HDD 204 and displays the display data on the display device 211. In displaying a list of images in the camera, the communication apparatus 101 receives thumbnail images corresponding to the captured images recorded on the recording medium 410 of the imaging apparatus 102 from the imaging apparatus 102. The communication apparatus 101 then stores the received thumbnail images into the HDD 204, and reads the stored thumbnail images from the HDD 204 and displays the thumbnail images on the display device 211. FIG. 6D illustrates an image list screen 664 which is displayed when the write-app 302 is displaying a list of images in the camera.

If the write-app 302 is detected to be in the state capable of linkage, then in step T508, the CPU 201 switches and operates the write-app 302 in the linkage mode. If the write-app is already activated and running in the background, the CPU 201 switches the write-app 302 to a foreground operation and operates the write-app 302 in the linkage mode. If the write-app 302 is not activated, the CPU 201 activates the write-app 302, switches the write-app 302 to the linkage mode, and runs the write-app 302 in the foreground. Specifically, when the write-app 302 operates in the linkage mode, a limitation is imposed on usable functions among those provided by the write-app 302. The limitation is reflected on a user interface (UI) display. FIG. 6A illustrates a display example of the top screen 661 of the write-app 302 in a normal mode. FIG. 6B illustrates a display example of a top screen 662 of the write-app 302 in the linkage mode. In the normal mode, all the functions are usable. All the functions are therefore selectable on the top screen 661 in FIG. 6A, and icons of the respective functions are displayed to indicate that. In the linkage mode, on the other hand, the usable functions are limited. On the top screen 662 in FIG. 6B, the icons of some unusable functions (live view imaging, camera time setting, and remote controller) are therefore not selectable and grayed out to indicate the impossibility of execution. On the top screen 662 in FIG. 6B, the color of a top bar 602 is changed to indicate that the write-app 302 is in the linkage mode different from the normal mode. The linkage mode of the write-app 302 imposes such a limitation on the functions to give priority to the operation for obtaining images in the imaging apparatus 102.

Figure 6E:
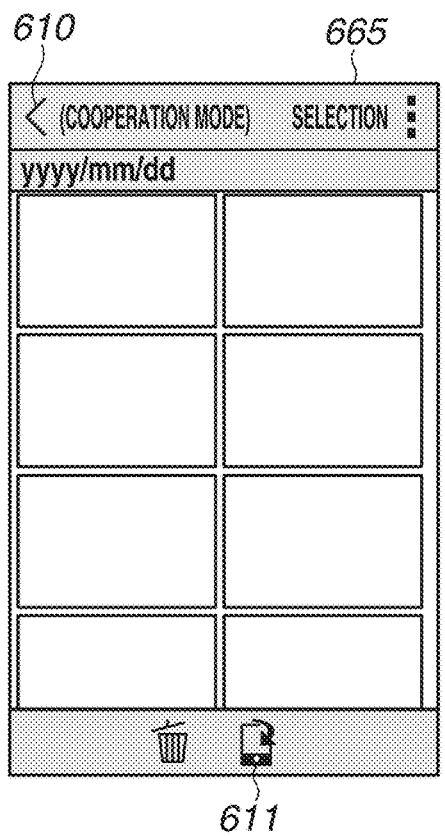

If the write-app 302 is performing the "list images in the camera" function when called from the read-app 303, then in step T508, the CPU 201 switches the write-app 302 to the linkage mode, and switches the display to an image list screen 665 in FIG. 6E and displays the image list screen 665 in the foreground. When the CPU 201 performs the "list images in the camera" function of the write-app 302, the CPU 201 receives from the imaging apparatus 102 thumbnail images corresponding to the actual images obtainable in the imaging apparatus 102. As illustrated in FIG. 6E, the CPU 201 then displays the image list screen 665 in which a plurality of thumbnail images is arranged. The user selects desired thumbnail images to be used by the read-app 303 from among the plurality of listed thumbnail images, and inputs instructions. The CPU 201 stores information about the selected thumbnail images into the RAM 203 as a "to-be-stored image list" in a manner readable to the write-app 302.

In step T509, if the CPU 201 detects, by using the write-app 302, that a storage button 611 on the image list screen 665 is pressed by the user, the CPU 201 issues an acquisition request for an actual image to the imaging apparatus 102 based on the to-be-stored image list. In step T510, the CPU 201 receives data on the actual image from the imaging apparatus 102 via the net I/F 209 by using the write-app 302. Thumbnail images have low resolution and small data size, compared to actual images. In displaying the "list of images in the camera", the thumbnail images corresponding to the actual images obtainable from the imaging apparatus 102 can thus be obtained to quickly display the thumbnail images on the display device 211. Communication load can be reduced by receiving only the actual images selected by the user among the actual images obtainable from the imaging apparatus 102.

If the reception of the actual image is completed, then in step T511, the CPU 201 performs processing for storing the actual image by the write-app 302. More specifically, the CPU 201 stores the file of the actual image received in step T510 into the HDD 204, and assigns an image ID to the new stored actual image. The image ID will be described to be a code associated with the file path of the storage location of the actual image. The image ID may be the file path of the storage location itself.

The processing from the request of an image in step T509 to the processing for receiving the image in step T510, the processing for storing the image in step T511, and the issuance of the image ID is repeated as many times as the number of actual images corresponding to the thumbnail images selected by the user. While performing the series of image storing processes, the CPU 201 displays a storage progress screen 666 illustrated in FIG. 6F on the display device 211.

Figure 6F:
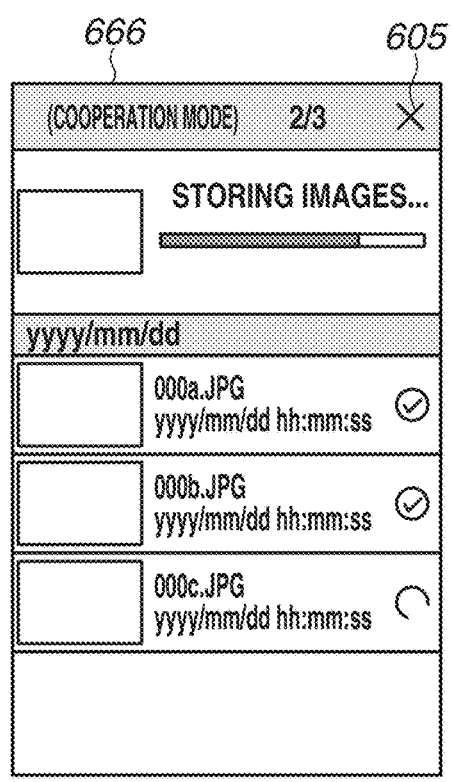
Figure 6G:
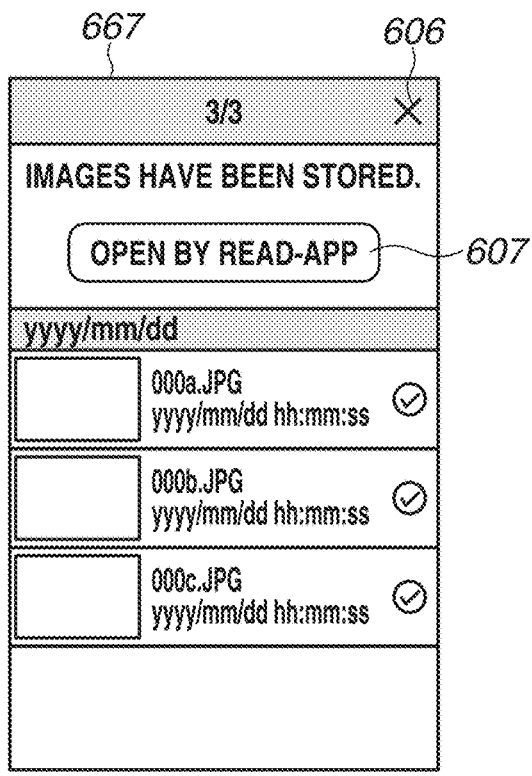
Figure 6H:
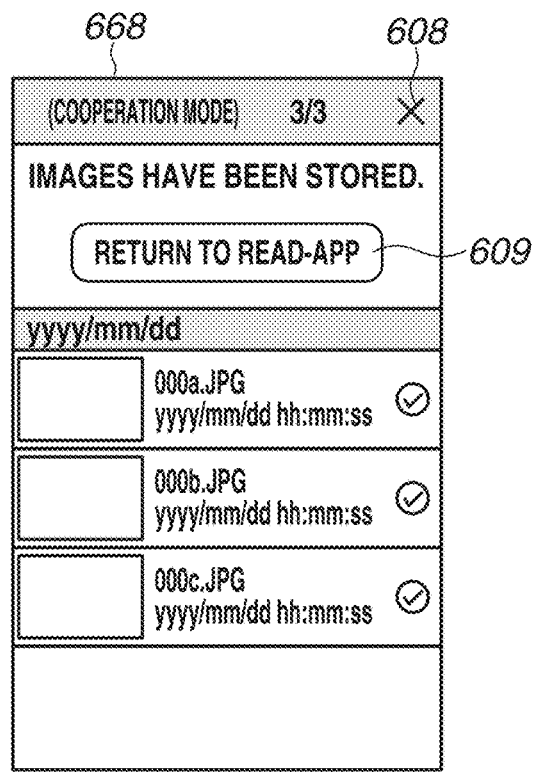

If the storage processing of all the actual images corresponding to the thumbnail images selected by the user is completed, the CPU 201 displays a storage completion screen 668 illustrated in FIG. 6H on the display device 211. If the CPU 201 detects that the user presses a "close" button 608, the CPU 201 returns to the display of the image list screen 665 in FIG. 6E without generating an image ID list to be described below. In such a manner, sharing of images obtained this time with the read-app 303 can be cancelled.

If the CPU 201 detects that a "RETURN TO READ-APP" button 609 on the storage completion screen 668 in FIG. 6H is pressed by the user, the CPU 201 starts the processing of step T512. In step T512, the CPU 201 generates an image ID list by the write-app 302. Specifically, the write-app 302 initially generates an image ID list that associates the image IDs of the images stored in step T511 with the storage locations, and stores the image ID list into the HDD 204 in a manner readable to the OS 301. This allows the read-app 303 to receive the image ID list via the OS 301 in step T516 to be described below, and use the image ID list for the processing of the read-app 303. The image ID list can therefore be said to be stored in the HDD 204 by the write-app 302 in a manner usable for the processing of the read-app 303. In step T513, the CPU 201 accepts, by using the OS 301, a request ID from the write-app 302 as a call request from the write-app 302 to the read-app 303. The request ID here is the same as that the write-app 302 receives in step T504.

In step T514, the CPU 201 cancels the linkage mode of the write-app 302, and switches and operates the write-app 302 in the normal mode. Specifically, the CPU 201 removes the limitation on the usable functions and restores the UI display to the state of the normal mode.

In step T515, the CPU 201 makes an activation request to the read-app 303 from the OS 301 to activate the read-app 303. When the read-app 303 activates, the read-app 303 obtains the ID of the requesting write-app 302 that has made the call request. The ID of the write-app 302 is an ID unique to the write-app 302 installed on the communication apparatus 101. The ID of the write-app 302 is stored into the HDD 204 when the write-app 302 is installed, and read and notified from the HDD 204 when the write-app 302 makes a call request for the read-app 303.

In the example illustrated in FIG. 5, the read-app 303 remains running after the processing of step T502 is performed. The processing of step T515 therefore functions as processing for checking whether a sleep state is cancelled or whether the read-app 303 is running. The read-app 303 may once stop running after the processing of step T502, and may be reactivated in response to the activation request of step T515. In step T516, the CPU 201 receives, by using the read-app 303, the image ID list generated by the write-app 302 in step T512 and the request ID received as a response in step T513, via the OS 301.

In step T517, the CPU 201 collates the ID of the write-app 302 by using the read-app 303. More specifically, the CPU 201 determines by using the read-app 303 whether the ID of the write-app 302 coincides with the ID of the write-app 302, stored in the HDD 204. The CPU 201 operates according to the read-app 303 and stores in advance the ID of the write-app 302 that can cooperate with the read-app 303, into the HDD 204 in a manner readable to the read-app 303. If the ID of the write-app 302 does not coincide with the ID stored in the HDD 204, then in step T518, the CPU 201 makes the read-app 303 notify the OS 301 of an error, and cancels the activation of the read-app 303. This can prevent the read-app 303 from being accidentally activated by an unknown application.

On the other hand, if the ID of the write-app 302 coincides with the ID stored in the HDD 204, then in step T519, the CPU 201 displays a screen corresponding to the request ID obtained in step T516. For example, the CPU 201 displays on the display device 211 a screen that is the same as that displayed when the request ID is notified from the read-app 303 in step T501. The CPU 201 then obtains the images from the HDD 204 based on the image ID list obtained by the read-app 303, and adds the images to the list display. For example, if "ADD PHOTOS FROM WRITE-APP" is selected on the screen illustrated in FIG. 7B, the CPU 201 displays the screen illustrated in FIG. 7B and adds new images to the list display of the images on the left of the screen.

In step T520, the CPU 201 performs the editing processing selected on the read-app 303 by the user on the images obtained in step T519, stores the editing result into the HDD 204 according to the OS 301, and ends the processing. The start timing of the editing processing may be either when the editing processing is instructed to start by the user or immediately after the completion of the processing of step T519. In the former case, for example, in the example of the screen illustrated in FIG. 7C, the CPU 201 obtains the images and then makes the user select a printer, the number of copies, and the images to be edited. After the input of the print settings, the CPU 201 displays an icon to start printing, and at the stage when the icon is selected, starts the editing processing (printing processing). In the latter case, for example, in the example of the screen illustrated in FIG. 7C, the CPU 201 initially makes the user select a printer and the number of copies before making the user select "ADD PHOTOS FROM WRITE-APP". If the user selects "ADD PHOTOS FROM WRITE-APP" with the print settings input, the CPU 201 considers it an instruction to start editing. If a plurality of images is obtained in step T519, the user may select only an image or images to perform the editing processing from among the plurality of images.

If a plurality of read-apps 303 is installed on the communication apparatus 101, the write-app 302 can receive an activation request from a read-app 303*b* while performing the foregoing processing with a read-app 303*a*. In such a case, the write-app 302 determines whether to accept the activation request from the read-app 303*b*, depending on the progress of the linkage processing with the read-app 303*a*.

In step T501, the CPU 201 accepts an activation request for the write-app 302 from the read-app 303*a*. The CPU 201 switches the write-app 302 to the linkage mode, and accepts an activation request from the read-app 303*b* until the state in which the processing for selecting images is performed on the image list screen 665 in FIG. 6E. In other words, the CPU 201 accepts an activation request from the read-app 303*b* until the processing of step T509 is performed. In step T505, the CPU 201 collates the ID of the read-app 303*b* by using the write-app 302. If the ID of the read-app 303*b* coincides with an ID stored in the HDD 204, the CPU 201 displays an application selection dialog for selecting either one of the read-apps 303*a* and 303*b* on the display device 211 by using the write-app 302. If the read-app 303*a* is selected, the CPU 201 maintains the read-app 303*a* as the linkage destination, and continues processing. In other words, the target to issue an activation request for in step T515 is the read-app 303*a*. On the other hand, if the read-app 303*b* is selected, the CPU 201 changes the linkage destination to the read-app 303*b* and continues processing. In other words, the target to issue an activation request for in step T515 is the read-app 303*b*.

If the CPU 201 detects that the user finishes selecting images and presses the storage button 611 on the image list screen 665 in FIG. 6E, the processing of the write-app 302 proceeds to step T509. The CPU 201 then no longer accepts an activation request from the read-app 303*b* or displays the application selection dialog.

As described above, according to the present embodiment, if the linkage destination read-app 303 makes an activation request to the linkage source write-app 302, the CPU 201 selectively performs processing according to the state of the write-app 302. For example, in a case where the write-app 302 is capable of linkage with the read-app 303, the CPU 201 switches and operates the write-app 302 in a predetermined mode (linkage mode). In a case where the write-app 302 is incapable of linkage with the read-app 303, the CPU 201 performs processing for displaying predetermined information (error message). Consequently, in a case where the write-app 302 is performing a specific function and is incapable of linkage when receiving an activation request, the write-app 302 can continue performing the function without interruption. In addition, the user can be informed that the write-app 302 is temporarily incapable of linkage in response to the activation request from the read-app 303. This allows the user to make a more smooth operation for linkage between the read-app 303 and the write-app 302 with refined usability.

Processing Procedure of Communication Apparatus

A processing procedure of the communication apparatus 101 according to a second embodiment will be described below with reference to FIGS. 6A to 6H and 8. The present embodiment describes processing in which the CPU 201 of the communication apparatus 101 initially activates a read-app, accepts a user's instructions on a screen for performing processing of the read-app, performs processing for calling a write-app, and cancels the processing in the middle. A description of configurations and processing similar to those of the first embodiment will be omitted as appropriate.

Figure 8:
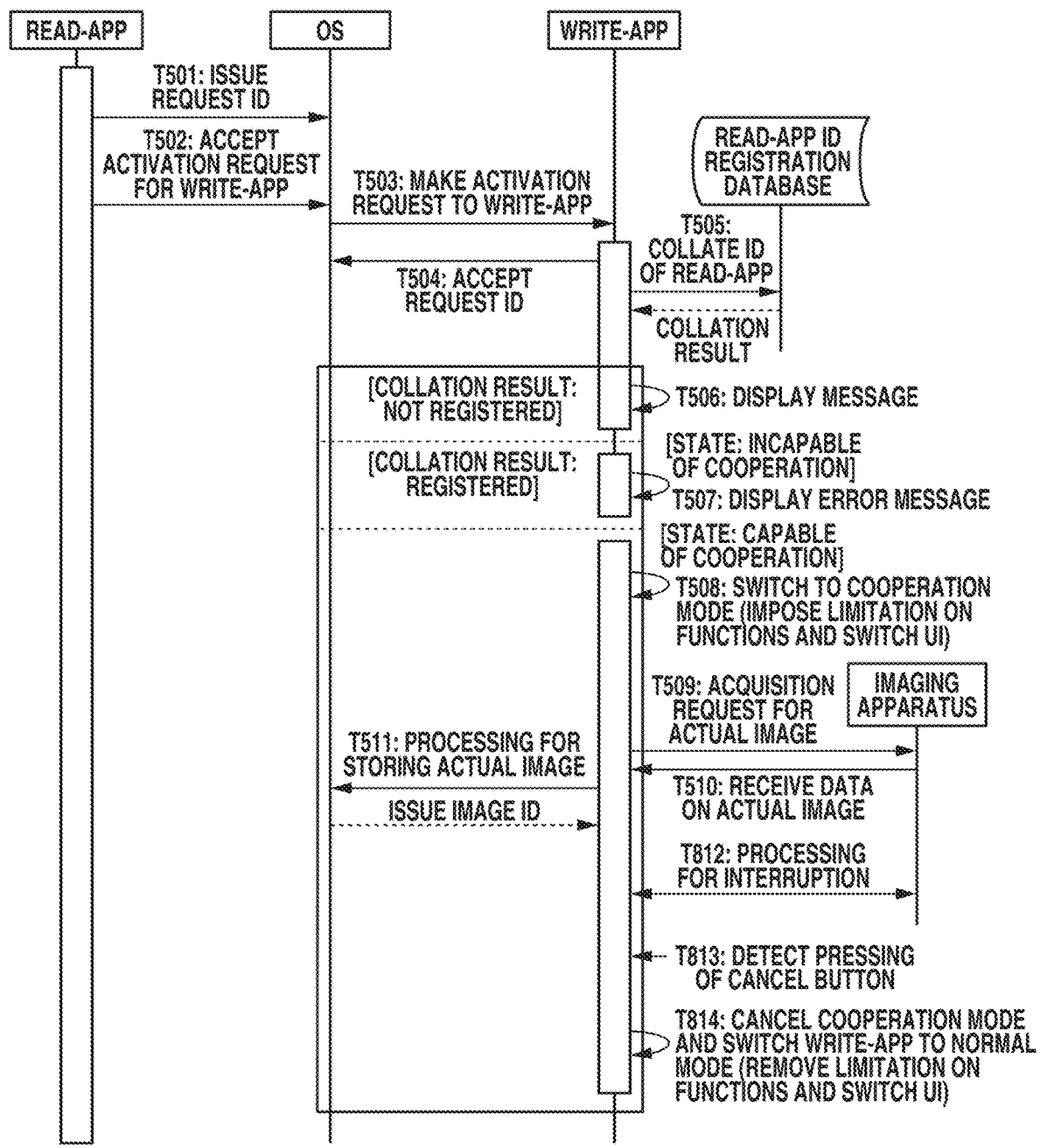
FIG. 8 is a sequence diagram for describing a processing procedure for activating the write-app from the read-app, obtaining images, and editing the images according to a second embodiment.

FIG. 8 is a sequence diagram for describing a processing procedure according to the present embodiment, in which the CPU 201 of the communication apparatus 101 activates the read-app and then activates the write-app to obtain images from an external apparatus by using the write-app. The CPU 201 then performs image editing processing on the obtained images by using the read-app. The processing described below is implemented by the CPU 201 of the communication apparatus 101 activating the OS 301, the write-app 302, and the read-app 303, and operating according to such programs and controlling various parts as appropriate. The CPU 201 initially performs the processing of steps T501 to T511 in FIG. 5 and the issuance of image IDs described above.

While the CPU 201 repeats the processing for receiving an image in step T510, the processing for storing the image in step T511, and the processing up to the issuance of an image ID is repeated as many times as the number of actual images corresponding to the thumbnail images selected by the user, the CPU 201 displays a storage progress screen 666 in FIG. 6F on the display device 211. The user can interrupt the image storing processing any time by pressing a "cancel" button 605.

Suppose that the "cancel" button 605 is detected to be pressed by the user. In step T812, if there is any image that is being obtained or yet to be obtained from the imaging apparatus 102, the CPU 201 notifies, by using the write-app 302, the imaging apparatus 102 of the interruption of the image acquisition processing. The CPU 201 then discards the "to-be-stored image list" stored in the RAM 203. Subsequently, the CPU 201 displays the image list screen 665 in FIG. 6E in the linkage mode on the display device 211. In other words, while the image acquisition processing is interrupted, the write-app 302 remains operating in the linkage mode. If the user wants to cancel the linkage mode of the write-app 302 and operate the write-app in the normal mode, the user presses a "back" button 610. If the "back" button 610 is detected to be pressed by the user, the CPU 201 displays the top screen 662 of the linkage mode, illustrated in FIG. 6B. In step T813, if a "CANCEL" button 603 is detected to be pressed by the user, then in step T814, the CPU 201 cancels the linkage mode of the write-app 302, switches and operates the write-app 302 in the normal mode, and displays a top screen 661 in FIG. 6A on the display device 211. In the present embodiment, only the write-app 302 is configured to have the linkage mode. However, this is not restrictive. For example, suppose that the read-app 303 also operates in the linkage mode. In such a case, when the linkage mode of the write-app 302 is cancelled in step T814, the CPU 201 may notify the read-app of the cancellation of the linkage mode via the OS 301 so that the linkage mode of the read-app 303 is also cancelled.

While the CPU 201 repeats the processing for receiving an image in step T510, the processing for storing the image in step T511, and the processing up to the issuance of an image ID as many times as the number of actual images corresponding to the thumbnail images selected by the user, a communication error such as disconnection of the communication between the communication apparatus 101 and the imaging apparatus 102 may occur. In such a case, the CPU 201 may display an error message on the write-app 302. The write-app 302 may notify the read-app 303 of the error, and the error message may be displayed on the read-app 303. Even if the communication with the imaging apparatus 102 is disconnected, the write-app 302 continues operating in the linkage mode. This allows the function to be immediately performed in the linkage mode when the error is resolved. If the "CANCEL" button 603 is detected to be pressed by the user, the CPU 201 may cancel the linkage mode of the write-app 302.

As described above, according to the present embodiment, if the linkage source write-app 302 is in the linkage mode, the "CANCEL" button 603 is provided on the screen. This allows the user to cancel the linkage mode of the write-app 302 any time and use the functions implemented on the write-app 302 without limitation. This can also prevent the write-app 302 from being left in the linkage mode with the usable functions limited if an unexpected event such as a communication error occurs. The user can thus cancel the linkage mode at arbitrary timing and use the functions of the write-app 302 without limitation.

Processing Procedure of Communication Apparatus

A processing procedure of the communication apparatus 101 according to a third embodiment will be described below with reference to FIGS. 6A to 6H and 9. The present embodiment describes an example where the CPU 201 of the communication apparatus 101 activates a write-app, accepts a user's instructions on a screen for performing processing of the write-app, and activates a read-app. A description of configurations and processing similar to those of the first and second embodiments will be omitted as appropriate.

FIG. 9 is a sequence diagram for describing a processing procedure according to the present embodiment, in which the CPU 201 of the communication apparatus 101 activates a write-app 302 and then activates a read-app 303 to perform image editing processing.

The CPU 201 of the communication apparatus 101 initially activates the write-app 302 in response to the user's operation, whereby processing is started. Activating the write-app 302, the CPU 201 displays the top screen 661 illustrated in FIG. 6A on the display device 211. If the CPU 201 detects that a "LIST IMAGES IN CAMERA" button 601 is pressed by a user operation, the CPU 201 displays the image list screen 664 illustrated in FIG. 6D on the display device 211. In displaying the image list screen 664, the communication apparatus 101 receives, from the imaging apparatus 102, thumbnail images corresponding to the captured images recorded on the recording medium 410 of the imaging apparatus 102, and stores the thumbnail images in the HDD 204 of the communication apparatus 101. The CPU 201 then reads the stored thumbnail images from the HDD 204 and displays the thumbnail images on the display device 211. The user selects desired thumbnail images to be used by the read-app 303 from among the plurality of listed thumbnail images. The CPU 201 stores information about the selected thumbnail images into the RAM 203 as a "to-be-stored image list" in a manner readable to the write-app 302. Suppose that the write-app 302 detects that a storage button 612 on the image list screen 664 in FIG. 6D is pressed by the user. If a plurality of read-apps 303 is installed on the communication apparatus 101, the write-app 302 displays on the display device 211 an application selection dialog for the user to select a read-app 303 to make an activation request. The CPU 201 stores the type of read-app 303 selected by the user here into the RAM 203 in a manner readable to the write-app 302.

In step T901, the CPU 201 makes an acquisition request for an actual image corresponding to a thumbnail image selected by the user to the external apparatus (imaging apparatus 102) by using the write-app 302 based on the to-be-stored image list. In step T902, the CPU 201 receives data on the actual image from the imaging apparatus 102 via the net I/F 209 by using the write-app 302.

In step T903, the CPU 201 performs processing for storing the actual image by the write-app 302. More specifically, the CPU 201 stores the file of the actual image received in step T902 into the HDD 204 and assigns an image ID to the new stored image.

The processing from the request for an image in step T901 to the processing for receiving the image in step T902, the processing for storing the image in step T903, and the issuance of the image ID is repeated as many times as the number of actual images corresponding to the thumbnail images selected by the user. If the storage processing of all the images is completed, the CPU 201 displays a storage completion screen 667 in FIG. 6G, on the display device 211. If the CPU 201 detects that a "close" button 606 is pressed by the user, the CPU 201 returns to the display of the image list screen 664 in FIG. 6D without generating an image ID list to be described below. In such a manner, sharing of the images obtained this time with the read-app 303 can be cancelled. On the other hand, if the CPU 201 detects that an "OPEN BY READ-APP" button 607 is pressed by the user, the CPU 201 starts the processing of step T904.

In the present embodiment, the write-app 302 is configured so that if a plurality of read-apps 303 is installed, the write-app 302 displays the application selection dialog and makes the user select an application before making an acquisition request for an actual image to the external apparatus (imaging apparatus 102) in step T901. However, this is not restrictive. The write-app 302 may be configured to display the application selection dialog and make the user select an application at timing when the "OPEN BY READ-APP" button 607 is detected to be pressed on the storage completion screen 667 after the processing for storing the actual images ends.

In step T904, the CPU 201 generates an image ID list by the write-app 302. Specifically, the write-app 302 initially generates an image ID list that associates the image IDs of the images stored in step T903 with the storage locations, and stores the image ID list into the HDD 204 in a manner readable to the OS 301. In step T905, the CPU 201 accepts an activation request for the read-app 303 from the write-app 302 by using the OS 301. If a plurality of read-apps 303 is installed, the CPU 201 accepts an activation request for the corresponding read-app 303 based on the type of stored read-app 303.

In step T906, the CPU 201 make an activation request to the read-app 303 from the OS 301 to activate the read-app 303. When the read-app 303 activates, the read-app 303 obtains the ID of the write-app 302 that has made the activation request. In step T907, the CPU 201 receives the image ID list generated by the write-app 302 in step T904 via the OS 301 by using the read-app 303.

In step T908, the CPU 201 collates the ID of the write-app 302 by using the read-app 303. More specifically, the CPU 201 determines by using the read-app 303 whether the ID of the write-app 302 coincides with the ID of the write-app 302, stored in the HDD 204. The CPU 201 operates according to the read-app 303 and stores in advance the ID of the write-app 302 that can cooperate with the read-app 303, into the HDD 204 in a manner readable to the read-app 303. If the ID of the write-app 302 does not coincide with the ID stored in the HDD 204, then in step T909, the CPU 201 displays a message that the request from the application is not acceptable, and quits the present processing. This can prevent the read-app 303 from being accidentally activated by an unknown application.

On the other hand, if the ID of the read-app 303 coincides with the ID stored in the HDD 204, the CPU 201 activates the read-app 303. As a result, a screen of the read-app 303 is displayed in the foreground. For example, if the read-app 303 is not running and is newly activated, a screen such as illustrated in FIG. 7A is displayed. If the read-app 303 is running and performing, for example, a "retouch photos" function in the background, a screen such as illustrated in FIG. 7B is displayed.

The CPU 201 then detects the state of the read-app 303 and performs processing based on the detection result. In a case where the read-app 303 is incapable of linkage, then in step T910, the CPU 201 performs control to display an error message by the read-app 303. In a case where the read-app 303 is capable of linkage, the processing proceeds to step T911.

Figure 7E:
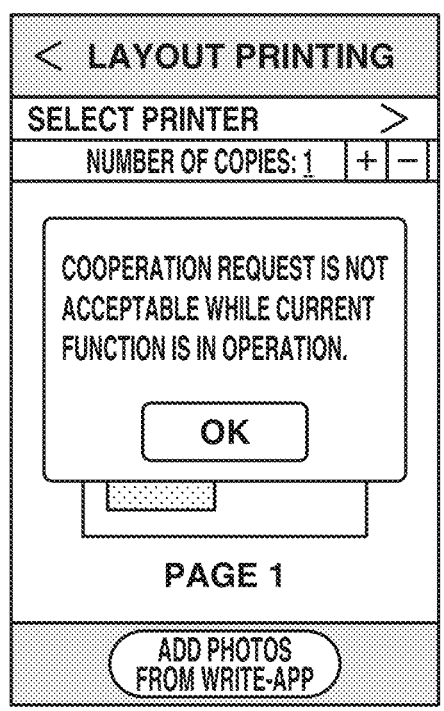

In the present embodiment, the state that is not capable of linkage refers to a state in which the read-app 303 is running on the communication apparatus 101 and already performing a specific function. If the read-app 303 is detected to be in the state that is not capable of linkage, then in step T910, the CPU 201 operates according to the read-app 303 and displays an error message indicating that the linkage request is not acceptable on the display device 211 as illustrated in FIG. 7E. This allows the user to easily find out that the read-app 303 is currently in a state of being temporarily unable to be called from the write-app 302.

The CPU 201 may be configured in such a manner that in a case where the read-app 303 is incapable of linkage, the CPU 201 operates according to the write-app 302, not the read-app 303, to display an error message on the display device 211. In such a case, in step T910, the CPU 201 calls the write-app 302 from the read-app 303 via the OS 301 and notifies the write-app 302 of the state that is not capable of linkage. The CPU 201 thereby activates and runs the write-app 302 in the foreground, and displays the error message on the write-app 302.

In the present embodiment, the state capable of linkage refers to a state where the read-app 303 is running on the communication apparatus 101 and performing a function different from those in the state that is not capable of linkage. The state capable of linkage also applies when the read-app 303 is not activated.

In a case where the read-app 303 is detected to be capable of linkage, then in step T911, the CPU 201 reads and obtains the actual images stored in step T903 from the HDD 204 by using the read-app 303 based on the image ID list obtained in step T907. The CPU 201 displays a screen for making the user give instructions about the content of editing on the display device 211. The screen illustrated in FIG. 7A is an example of the screen for making the user give instructions about the content of editing. If the user selects the content of editing, screens such as illustrated in FIGS. 7B to 7D are displayed. Here, the images obtained from the imaging apparatus 102 are also displayed as included in the list of images. To make a distinction from the images that have already been stored in the HDD 204, the images may be listed in such a manner that the ones obtained immediately before can be distinguished from the others.

In step T912, the CPU 201 performs, by using the read-app 303, the editing processing selected by the user on the images obtained in step T911. The CPU 201 stores into the HDD 204 the images on which the editing processing is reflected, and ends the present processing.

If a plurality of read-apps 303 is installed on the communication apparatus 101, the write-app 302 can receive an activation request from a read-app 303*b* while the write-app 302 is performing the processing for activating a read-app 303*a*. In such a case, the write-app 302 determines whether to accept the activation request from the read-app 303*b*, depending on the progress of the linkage processing with the read-app 303*a*.

The CPU 201 accepts an activation request from the read-app 303*b* until the state in which the write-app 302 is activated to perform the "list images in the camera" function, the image list screen 664 in FIG. 6D is displayed on the display device 211, and the processing for accepting the user's selection of thumbnail images corresponding to images to be used by the read-app 303*a* is performed. That is, the CPU 201 accepts an activation request from the read-app 303*b* until the processing of step T901 is performed. In such a case, the CPU 201 proceeds with the linkage processing of the write-app 302 and the read-app 303*b* according to the sequence in FIG. 5 or 8 described above without starting the linkage processing of the write-app 302 and the read-app 303*a*.

If the CPU 201 detects that the user finishes selecting images and presses the storage button 612 on the image list screen 664 in FIG. 6D, the processing of the write-app 302 proceeds to step T901. The CPU 201 then no longer accepts the activation request for the write-app 302 from the read-app 303*b*.

Suppose, as described above, that the linkage source is the read-app 303, the linkage destination is the write-app 302, the write-app 302 makes an activation request to the read-app 303, and the call is not acceptable due to the state of the read-app 303. In such a case, according to the present embodiment, the CPU 201 rejects the activation request from the write-app 302 and displays an error message on the read-app 303. Consequently, if the read-app 303 is performing a specific function when receiving an activation request from the write-app 302, the read-app 303 can continue performing the function without interruption. In addition, the user can be informed that the read-app 303 is in a state of being temporarily unable to be activated in response to the activation request from the write-app 302. This allows the user to make a more smooth operation for linkage between the read-app 303 and the write-app 302 with refined usability.

Other Embodiments

In the foregoing embodiments, the write-app 302 is described to be an application that the communication apparatus 101 uses to obtain images from the imaging apparatus 102. However, the write-app 302 may be applied to applications for other uses. For example, an application for searching a database for images and an application for performing imaging processing may be used as the write-app 302. In such cases, an image ID list of searched images or newly captured images is generated. In the foregoing embodiments, the data to be handled is described to be image data. However, the data is not limited to image data, and may be other data such as audio data.

In the foregoing embodiments, the communication apparatus 101 is described by using a smartphone as an example. However, the communication apparatus 101 is not limited to any particular apparatus as long as the applications can be installed. For example, the communication apparatus 101 may be similarly applied to a mobile phone, a tablet, and a personal computer (PC). If the read-app 303 and the write-app 302 are applications that do not need a communication function, the communication apparatus 101 does not necessarily need to include a communication function and may be implemented by a wide variety of information processing apparatuses.

In a case where an application receiving an activation request from another application cannot respond to the activation request, an information processing apparatus can notify the user of that for refined usability.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-090583, filed Apr. 28, 2017, which is hereby incorporated by reference herein in its entirety.

What is claimed is:

1. An information processing apparatus to activate application programs, including a first application program and a second application program, the information processing apparatus comprising:

a processor; and a memory storing a program which, when executed by the processor, causes the information processing apparatus to perform operations including:

receiving a request for a specific function from the first application program, wherein a plurality of functions including the specific function are able to be performed by executing the second application program, performing the specific function by switching from a first function being performed to the specific function in response to the request for the specific function by executing the second application program, if the first function among the plurality of functions is performed by executing the second application program when the request for the specific function is received from the first application program, and performing a second function without switching from the second function being performed to the specific function in response to the request for the specific function by executing the second application program, if the second function, among the plurality of functions and different in type from the first function, is performed by executing the second application program when the request for the specific function is received from the first application program, wherein the specific function and the second function use a communication function for connecting to an external apparatus via a network and the first function does not use the communication function.

2. The information processing apparatus according to claim 1, wherein executing the program further causes the information processing apparatus to perform operations of displaying predetermined information, if the second function is performed by executing the second application program when the request for the specific function is received from the first application program.

3. The information processing apparatus according to claim 1, wherein the specific function is a function for connecting to the external apparatus via the network, acquiring an image from the external apparatus, and storing the acquired image into a storage medium.

4. The information processing apparatus according to claim 1, wherein the second function is a function for connecting to an imaging apparatus as the external apparatus via the network, receiving a live-view image from the imaging apparatus, and displaying the live-view image on a display device.

5. The information processing apparatus according to claim 1, wherein executing the program further causes the information processing apparatus to perform operations of displaying a screen of the second application program in a foreground of a display device and hiding a screen of the first application program in a background of the display device in response to performing the specific function by switching from the first function to the specific function by executing the second application program.

6. A method for activating application programs, including a first application program and a second application program, the method comprising:

receiving a request for a specific function from the first application program, wherein a plurality of functions including the specific function are able to be performed by executing the second application program;

performing the specific function by switching from a first function being performed to the specific function in response to the request for the specific function by executing the second application program, if the first function among the plurality of functions is performed by executing the second application program when the request for the specific function is received from the first application program; and performing a second function without switching from the second function being performed to the specific function in response to the request for the specific function by executing the second application program, if the second function, among the plurality of functions and different in type from the first function, is performed by executing the second application program when the request for the specific function is received from the first application program, wherein the specific function and the second function use a communication function for connecting to an external apparatus via a network and the first function does not use the communication function.

7. A non-transitory computer-readable storage medium storing a program to cause a computer to perform a method for activating application programs, including a first application program and a second application program, the method comprising:

receiving a request for a specific function from the first application program, wherein a plurality of functions including the specific function are able to be performed by executing the second application program;

performing the specific function by switching from a first function being performed to the specific function in response to the request for the specific function by executing the second application program, if the first function among the plurality of functions is performed by executing the second application program when the request for the specific function is received from the first application program; and performing a second function without switching from the second function being performed to the specific function in response to the request for the specific function by executing the second application program, if the second function, among the plurality of functions and different in type from the first function, is performed by executing the second application program when the request for the specific function is received from the first application program, wherein the specific function and the second function use a communication function for connecting to an external apparatus via a network and the first function does not use the communication function.

* * * * *